Oct. 7, 1930.   E. B. NICHOLS   1,777,806
LIQUID METER
Filed Aug. 24, 1926   4 Sheets-Sheet 1

INVENTOR
Edgar B. Nichols
BY
his ATTORNEYS

Oct. 7, 1930.  E. B. NICHOLS  1,777,806
LIQUID METER
Filed Aug. 24, 1926     4 Sheets-Sheet 2
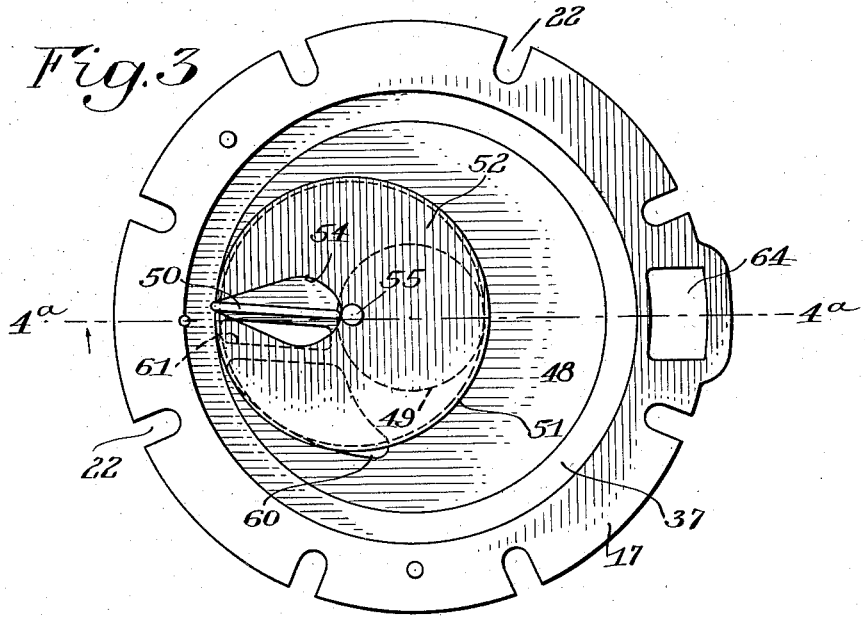
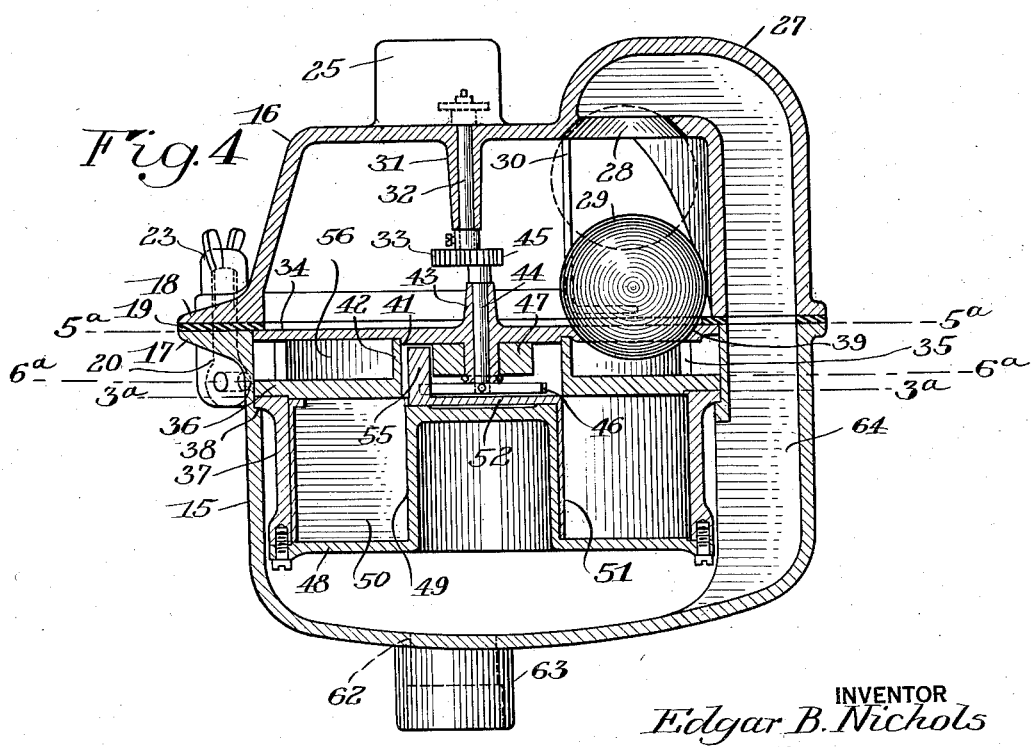
INVENTOR
Edgar B. Nichols
BY
his ATTORNEYS Oct. 7, 1930.  E. B. NICHOLS  1,777,806
LIQUID METER
Filed Aug. 24, 1926   4 Sheets-Sheet 3

INVENTOR
Edgar B. Nichols
BY
his ATTORNEYS

Oct. 7, 1930.   E. B. NICHOLS   1,777,806
LIQUID METER
Filed Aug. 24, 1926   4 Sheets-Sheet 4
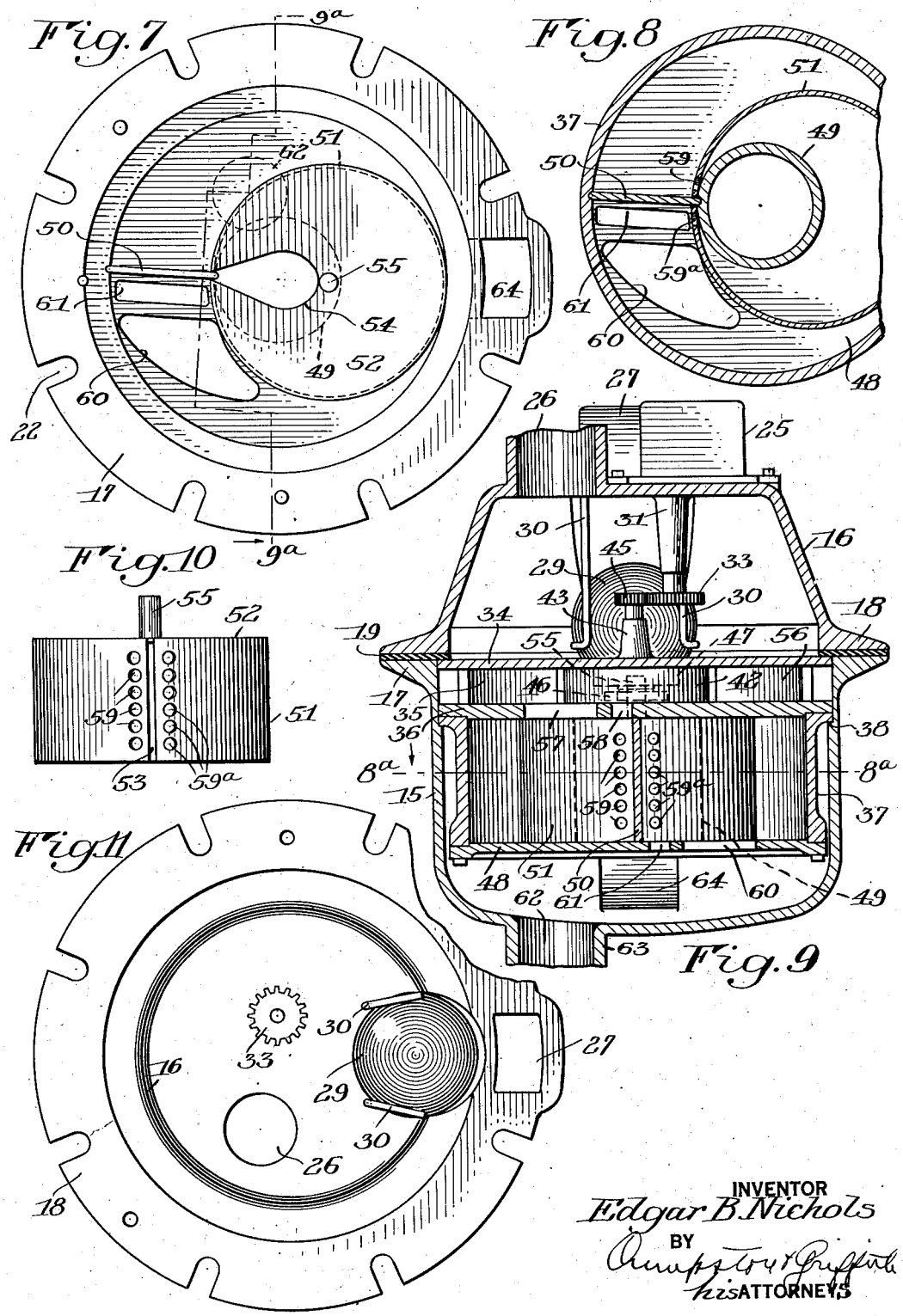
INVENTOR
Edgar B. Nichols
BY
his ATTORNEYS Patented Oct. 7, 1930

1,777,806

UNITED STATES PATENT OFFICE

EDGAR B. NICHOLS, OF ROCHESTER, NEW YORK, ASSIGNOR TO PFAUDLER COMPANY, OF ROCHESTER, NEW YORK, A CORPORATION OF NEW YORK

LIQUID METER

Application filed August 24, 1926. Serial No. 131,294.

This invention relates to liquid meters, of the variety adapted, for example, for measuring a flow of liquid, one object of the invention being to provide an accurate and efficient device of this character and one suitable for use with apparatus in which liquid is circulated by air or other gaseous pressure, with provision for separating the liquid and gas to prevent the actuation of the device by gaseous pressure.

Another object is to provide a meter of the above nature conforming with sanitary standards, as required, for example, in the measurement of milk or other food ingredients and having a construction comprising a minimum number of parts accessibly arranged and adapted to be disassembled and cleaned.

Another object is to provide a sanitary meter of the above character having its parts constructed and arranged to effect complete drainage of the same by gravity whenever the supply of liquid is discontinued.

To these and other ends the invention resides in certain improvements and combination of parts all as will be hereinafter more fully described the novel features being pointed out in the claims at the end of the specification.

In the drawings:

Figure 3 is a top plan view of certain portions of the apparatus as seen from the line 3ª—3ª in Figure 4;

Figure 4 is a sectional elevation substantially on the line 4ª—4ª in Figure 3, but showing the whole apparatus;

Figure 7 is a view similar to Figure 3, but showing the parts in a different position;

Figure 8 is a fragmentary sectional view on the line 8ª—8ª in Figure 9, showing the parts in the same position as in Figure 7.

Figure 9 is an elevation substantially on the line 9ª—9ª in Figure 7, but showing the whole apparatus;

Figure 10 is an elevation of a measuring piston forming a part of the apparatus; and Figure 11 is a bottom plan view of the cover portion of the casing.

Similar reference numerals throughout the several views indicate the same parts.

The embodiment of the invention herein disclosed, by way of illustration, shows the application of the principles involved to liquid metering apparatus of the positive type, adapted for use with a supply of liquid circulated under gaseous pressure or in any other manner and particularly adapted for use in measuring milk or other ingredients of foods requiring sanitary handling. That is to say, the present embodiment represents a construction in which all of the parts are adapted and arranged for complete drainage of the liquid therefrom after use and for being readily disassembled to afford access for thorough cleaning.

Figure 1:
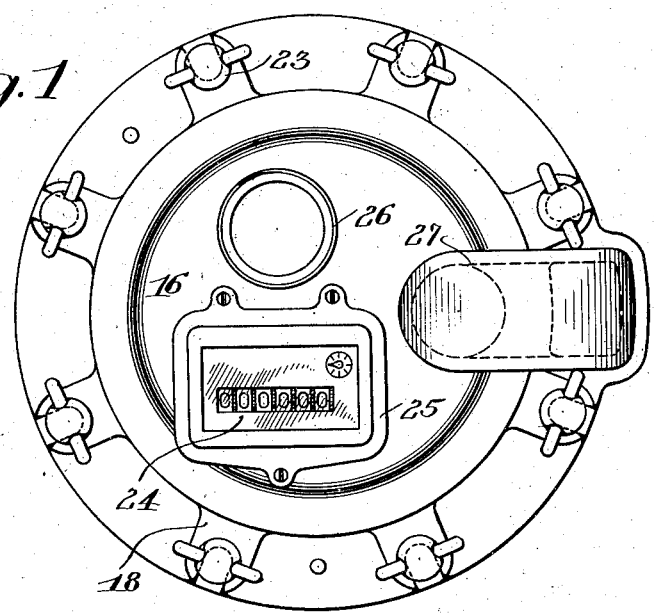
Figure 1 is a top plan view of a meter embodying the present invention.
Figure 2:
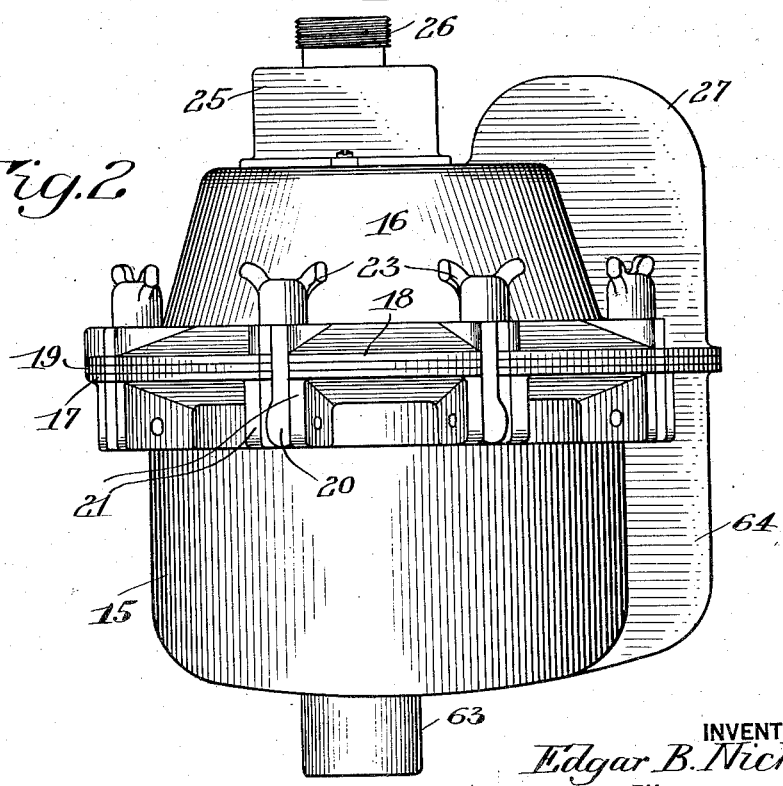
Figure 2 is a side elevation of the same.

Referring more particularly to the drawings, the present embodiment comprises, preferably, a compact, self-contained casing having a base portion 15 substantially cup-shaped as shown, and a cover portion 16, these portions being formed at their meeting edges with flanges 17 and 18, respectively, to afford a substantial seating of one upon the other, with an interposed gasket 19 to render the joint fluid tight. To provide for the ready detachment of the cover portion for access to the interior, the casing portions are connected by a series of swing bolts 20 pivoted between pairs of lugs 21 under the flange 17 of the base portion and engaging in recesses 22 in the flange of the cover portion, with wing nuts 23 for securing the bolts and detachably clamping the casing portions together. The base portion of the casing contains a positive liquid measuring device, as more particularly described hereafter, such device including a moving part or piston actuated by the transmitted liquid and having a driving connection with registering mechanism indicated generally at 24, Figure 1, in a casing part or housing 25 on the top of the cover portion as shown. Such registering mechanism may be of any known or suitable variety and its particular construction forms no part of the present invention.

In the use of positive liquid meters as heretofore known, various difficulties have been experienced, due for example, to the interference with the accurate functioning of the apparatus by the air or other gas trapped in the liquid, particularly in connection with equipment in which the liquid is subjected to or circulated by air or other gaseous pressure which has a tendency to overdrive the meter. It has been found that this difficulty is overcome by separating the liquid and gas adjacent the inlet to the meter and by-passing the gas about the measuring device under control of suitable automatic valve means, operating when the supply of liquid ceases, to substantially close the liquid path against the gas and to close the by-pass during the supply of liquid.

To this end the cover portion 16 of the casing is preferably formed to provide a separation chamber for the liquid and air or other gas with an intake opening in its top wall fitted with a nipple 26 for attachment to a supply pipe line. This portion of the casing is provided in the present instance with one part of a by-pass channel 27, Figure 4, preferably formed by wall portions integral with the casing as shown. The by-pass communicates through the top of the casing cover and through a valve seat 28 on the latter with which cooperates a float ball valve 29 playing vertically between the side wall of the cover and depending guide rods 30 carried by the latter. The cover top wall is provided also with a boss 31 forming a bearing for a spindle 32 extending at its upper end into driving connection with the registering mechanism 24 while the lower end of the spindle in the separation chamber has fixed thereon a single spur gear 33.

Figure 5:
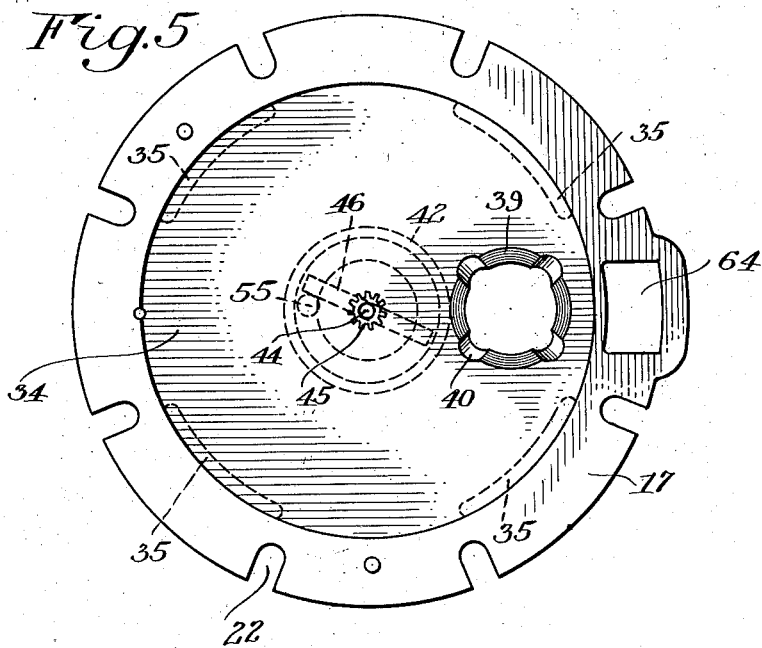
Figure 5 is a top plan view of portions of the apparatus as seen from the line 5ª—5ª in Figure 4.

The casing cover and base portions are separated by a disk-like partition plate 34 having on its underside spaced lugs 35, Figure 5, by which it is supported in spaced relation on the cover plate 36 of a cage 37 of the liquid measuring device which latter, in turn, is seated on an annular shoulder 38 in the casing base. Partition 34 is formed with a seat 39 Figures 4 and 5, for the ball valve 29, this seat being vertically aligned with the by-pass seat 28. Seat 39 forms the sole port or passage for the liquid to the measuring device and through the meter and it will be apparent from this construction that the hollow buoyant ball valve 29 is adapted to either engage seat 39 and close the liquid passage when the supply of liquid ceases, or to be raised by the liquid into contact with seat 28 to close the by-pass while liquid is being supplied. Seat 39 is preferably vented as by indentations 40, Figure 5, to provide for complete drainage of the milk or other liquid from the cover portion and partition 34 even when the valve 29 falls to substantially close the seat or port 39.

Partition 34 is formed adjacent the center of its underside with a boss 41 fitted within the upper end of a flange 42 projecting upwardly from the cover plate 36 of the measuring device. Plate 34 is also formed centrally with a bearing portion 43 projecting from opposite sides thereof and rotatably supporting a spindle 44 having fixed on its upper end, in the separation chamber, a single spur gear 45 meshing directly with the gear 33 of the spindle for driving the registering mechanism. Spindle 44 projects at its lower end beyond bearing 43 and has fixed thereon a cross bar 46 driven by the measuring device as hereafter described. The lower end of bearing 34 below plate 34 serves also as a bearing for a roller 47 which operates as a guide for a measuring piston as hereafter described.

The measuring device proper is of a positive and accurate character comprising a cage formed by a cylindrical wall portion 37 having a cover plate 36 as described above and a bottom plate 48. The latter is preferably secured by screws to the side walls 37 as shown while the cover plate 36 is formed with a shoulder fitted within the top of the walls 37 so that it may be readily detached for access to the interior and removal of the contained parts. Bottom plate 48 has an upwardly projecting central boss 49 closed at its top and is of generally cylindrical shape extending adjacent the bottom of the cover plate 36. A partition 50 extends between the side wall 37 and the boss 49 as shown. The boss 49, partition 50 and other parts form guides for a horizontally oscillating piston 51 of generally cylindrical shape with a top wall 52, the bottom of the piston being open and resting on the bottom plate 48 of the cage about the boss 49. The side wall of the piston is slotted vertically at one side as at 53 and the top wall is formed with an elongated curved recess 54. The top of the piston rests upon the top of the boss 49 of the cage between the latter and the bottom of the cover plate 36 with the cage partition 50 embraced in the piston side wall slot 53 as shown. The piston cover carries a vertically projecting stud 55 at its center playing between the boss 42 of the cover plate 36 and the guide roller 47.

It will be seen that while the piston may not rotate, it is adapted to oscillate horizontally about the cage boss 49 while the slot 53 of the piston travels back and forth along the partition 50 and the stud 55 describes a circle in engagement with the bar 46 of spindle 44 for driving the registering mechanism, such motion of the piston being produced by the flow of the liquid, as hereafter described.

Figure 6:
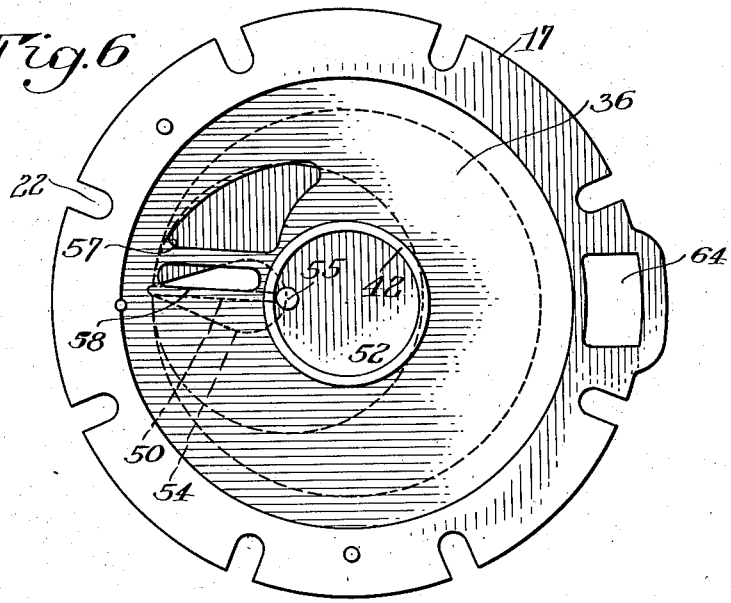
Figure 6 is a similar view as seen from the line 6ª—6ª in Figure 4.

The cover plate 36 of the piston cage forms a tight closure with the side walls of the casing base by means of its flange 42, with the bottom of partition plate 34, so that the milk or other liquid, passing from the inlet through port 39 into the space 56, passes through openings 57 and 58 in the cage cover plate 36, Figure 6. These openings are at one side of the partition 50 so that the liquid passing through the same enters the piston through its recess 54 and through side openings as at 59, and enters between the side wall of the piston and the side wall 37 of its cage, through a portion of the path of movement of the piston. The pressure of such liquid tends to move the piston from the position shown in Figure 6 in a clock-wise direction through the position shown for example, in Figure 7. The bottom plate 48 of the piston cage is provided with similar ports 60 and 61, Figure 7, which are uncovered by the piston in its movement so that the liquid on the other side of the piston and that within the same is discharged through openings 60 and 61 into the bottom of the casing. The piston is provided at this side with openings 59ª similar to openings 59, to assist in the discharge of the liquid within the same. The piston oscillates continuously in this manner as long as liquid is supplied and forms a positive closure between the inlet and outlet openings of its cage so that the number of its oscillations forms an accurate measure of the quantity of liquid transmitted, this form of measuring cage and piston being known in the art. As the piston oscillates its stud 55 drives the bar 46 and the registering mechanism through the connections described.

It will be noted that the open construction of the piston and the arrangement of the openings 57 and 58, 60 and 61 provide for complete drainage of the liquid from the space 56 and from the measuring device into the base of the casing. The casing base curves downwardly to a central depression at which it is formed with an outlet 62 having a nipple 63 for connection with a discharge pipe line, this outlet being arranged to completely drain the casing.

The base of the casing has its wall at one side formed with a by-pass channel 64 as shown communicating with the by-pass 27 of the cover portion and with the bottom portion of the casing base, so that this by-pass extends from the separation chamber in the cover portion around or to the opposite side of the measuring device.

In operation when milk or other liquid is supplied to the meter through its inlet 26, the liquid tends to fill the separation chamber and to raise the float valve 29 so that it passes through port 39 and through openings 57 and 58 to oscillate the piston. During the raising of the float valve any quantity of air or other gas entering the meter may escape through the by-pass around the measuring device without influencing the operation of the latter so that it accurately registers the quantity of liquid alone which is transmitted. When the separation chamber is filled with liquid or in other words when a full flow of liquid is supplied to the meter the float valve is raised to close the by-pass to prevent the escape of liquid through the latter. In case of the entrance of any air, however, the float valve falls to by-pass the same as described but operates at all times to prevent the escape of liquid through the by-pass. When the flow of liquid is discontinued the ball valve drops to its seat over port 39 thus opening the by-pass but substantially closing the path through the measuring device so that no sufficient current of air can pass through the latter to drive the same. Even when the valve closes port 39, however, the liquid may drain through the latter by means of vents 40 and through the measuring device into and from the bottom of the casing, so that the apparatus is completely self-draining as necessary to meet the sanitary requirements of various uses such as the measuring of milk.

It is to be noted that the casing portions may be conveniently and quickly detached by throwing off the swing bolts 20. The apparatus comprises a comparatively small number of parts practically all of which are readily removable from the casing for cleaning as necessary to meet sanitary requirements. The invention thus provides a self-contained compact mechanism with provision for the separation of air and with automatic valve means to effect coordinating closing of the liquid path and air by-pass. The meter is thus adapted to operate accurately under either low or high pressure without interference by air mixing with the milk and when the use of the meter is discontinued or at suitable intervals during its use its parts may be readily disassembled and cleaned or sterilized.

I claim as my invention:

1. In a sanitary liquid meter, the combination of a casing having a base portion provided with an outlet adapted to completely drain the same and having also a cover portion provided with inlet means comprising an air separation chamber, swingingly mounted connecting elements detachably securing said casing portions together, a positive liquid measuring device arranged in said casing between said chamber and outlet for transmitting the liquid and for actuation thereby, said device having an outlet for completely draining the same into said casing, said casing having a by-pass leading from said air separating chamber through said base portion to the first mentioned outlet, float valve means for controlling said by-pass and the supply of liquid from said chamber to said device, and registering mechanism driven by said device.

2. In a sanitary liquid meter, the combination of a casing having a base portion provided with a chamber having an outlet adapted to completely drain the same, and also having a cover portion forming an air separation chamber, means detachably securing said casing portions together, a positive liquid measuring device arranged in said base portion for transmitting the liquid and for actuation thereby, said device having an outlet for completely draining the same into said base portion, the casing having a by-pass connecting said separation chamber with the base portion on the discharge side of said measuring device, float valve means for controlling said by-pass and the supply of liquid from said separation chamber to said device, and registering mechanism driven by said device.

3. In a meter, the combination of a casing provided with a dividing wall forming liquid receiving and discharge chambers within the casing and having a discharge opening, a liquid measuring device arranged in the discharge chamber and adapted to receive the liquid through the opening in said wall, said device being actuated by the liquid flowing thereto through said opening, a registering mechanism operated by said measuring device, said discharge chamber having an outlet adapted to completely drain the same, said casing having a by-pass leading from the receiving chamber and communicating with said outlet, and valve means for controlling said opening and said by-pass.

4. In a meter, the combination of a casing provided with a dividing wall forming liquid receiving and discharge chambers within the casing and having a discharge opening, a liquid measuring device arranged in the discharge chamber adapted to receive the liquid through the opening in said wall, said device being actuated by the liquid flowing thereto through said opening, a registering mechanism operated by said measuring device, said discharge chamber having an outlet adapted to completely drain the same, said casing having a by-pass leading from the receiving chamber and communicating with said outlet, and a float valve within the liquid receiving chamber adapted to control said opening and said by-pass.

5. In a meter, the combination of a casing forming upper and lower chambers having a dividing wall therebetween, said casing being provided with liquid inlet and outlet passages, a liquid measuring device in the lower chamber adapted to transmit liquid and to be actuated thereby, said dividing wall having a discharge passage leading to the measuring device, registering mechanism driven by said measuring device, said casing having a by-pass connecting said chambers and valve means within the upper chamber adapted for controlling the discharge passage leading therefrom to said measuring device and also arranged to close said by-pass when the liquid rises to a predetermined level in said upper chamber.

6. In a sanitary liquid meter, the combination of a casing comprising a base portion provided with a chamber having an outlet adapted to completely drain the same and having also a cover portion with an air separation chamber provided with a liquid inlet, said chambers having a partition therebetween, a liquid measuring device arranged in the chamber of the base portion adapted to transmit the liquid and to be actuated thereby, registering mechanism driven by said device, said casing having a by-pass connecting the separation chamber with the outlet of said base portion, said partition having an opening for discharging the liquid from the separation chamber downwardly to said measuring device and valve means for controlling said by-pass and the outlet opening of said partition.

7. In a liquid meter, the combination of a casing having upper and lower liquid receiving and discharge chambers, an intermediate chamber therebetween, a measuring device arranged in the lower chamber to transmit the liquid and to be actuated thereby, a registering mechanism driven by said device, said casing having an air discharge passage leading from the upper to the lower chamber, one wall of the casing having a liquid discharge opening leading from the upper to the intermediate chamber and valve means for controlling said passage and said discharge opening.

8. In a liquid meter, the combination of a casing having a liquid receiving and discharge chambers, one wall of said casing having a liquid discharge passage, said casing having an air discharge passage for by-passing air from the receiving to the discharge chamber, valve means within the casing adapted to normally control the liquid discharge passage and arranged for movement to open the same and to close the air discharge passage, a measuring device within the liquid discharge chamber arranged to communicate with the liquid discharge passage and adapted to transmit the liquid and to be actuated thereby, and a registering mechanism driven by said device.

9. In a sanitary liquid meter the combination of a casing having a base portion provided with an outlet arranged to completely drain the same, and having also a detachable cover portion provided with inlet means comprising an air separation chamber, a cage detachably supported in said base portion, and provided with an inlet communicating with said chamber and an outlet for completely draining said cage into said casing, an oscillating piston in said cage for measuring and transmitting said liquid and for actuation thereby, registering mechanism driven by said piston, said casing having a by-pass communicating with said chamber and with the opposite side of said cage, and a float valve for controlling said by-pass and said cage inlet.

10. In a sanitary liquid meter, a casing having a base portion with an outlet arranged to completely drain the same and having a detachable cover portion provided with inlet means, a positive liquid measuring device arranged in said casing between said inlet means and said outlet for transmitting said liquid and for actuation thereby, said device having an outlet for completely draining the same into said casing, a spindle on said device rotated thereby and provided with a gear, registering mechanism having a spindle provided in said casing with a single gear meshing directly with the gear on said device spindle, said casing having a by-pass communicating with said inlet means and said outlet at opposite sides of said device and float valve means controlling said by-pass and the supply of liquid from said casing inlet to said device.

11. In a sanitary liquid meter, the combination of a casing having a base portion provided with an outlet arranged to completely drain the same and having a detachable cover portion provided with an inlet and with an air separation chamber, a positive liquid measuring device detachably mounted in said casing between said chamber and said outlet for transmitting said liquid and for actuation thereby, a spindle rotated by and extending from said device into said chamber and provided therein with a single gear, registering mechanism on said casing having a spindle extending into said chamber and provided therein with a single gear meshing directly with the gear of said device spindle, said casing having a by-pass communicating with said chamber and with the opposite side of said device, the casing having a vented port between said chamber and device and a float ball valve in said chamber for controlling said inlet and said port.

12. In a liquid meter the combination of a casing having a base portion provided with an outlet and a cover portion provided with inlet means comprising an air separation chamber, a positive liquid measuring device detachably mounted in said base portion for transmitting said liquid and for actuation thereby, a partition detachably mounted in said casing between said chamber and device in spaced relation with the latter, said partition being formed with a port, a spindle on said partition, having a driving connection with said device and provided with a gear in said chamber, registering mechanism on said casing, having a spindle extending into said chamber and provided therein with a single gear meshing directly with the gear of said partition spindle, said casing having a by-pass communicating with said chamber opposite said partition port and with the opposite side of said device, a float ball valve guided for movement in said chamber between said by-pass and partition port for controlling one or the other and means for detachably securing said casing portions together.

EDGAR B. NICHOLS.